United States Patent
Vackar

(10) Patent No.: US 7,665,185 B2
(45) Date of Patent: Feb. 23, 2010

(54) INCREMENTAL LOCKING HINGE ASSEMBLY

(75) Inventor: Mark A. Vackar, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 11/753,150

(22) Filed: May 24, 2007

(65) Prior Publication Data

US 2007/0214603 A1    Sep. 20, 2007

Related U.S. Application Data

(63) Continuation of application No. 10/704,564, filed on Nov. 12, 2003, now Pat. No. 7,222,395.

(51) Int. Cl.
*E05D 11/10* (2006.01)
(52) U.S. Cl. .............................. 16/330; 16/334; 16/342
(58) Field of Classification Search ................ 16/342, 16/327–330, 314, 229, 257, 312, 317, 334; 361/814, 680–683; 455/575.1, 575.4, 575.8, 455/550.1, 90.3; 248/919–923, 282.1, 288.51, 248/292.13, 125.9, 242, 284.1; 348/333.06, 348/373, 837, 744
See application file for complete search history.

(56) References Cited

U.S. PATENT DOCUMENTS

| | | | |
|---|---|---|---|
| 365,413 A | 6/1887 | Stuart | |
| 595,789 A | 12/1897 | Smith | |
| 3,000,049 A | 9/1961 | Terry, Jr. | |
| 3,586,355 A | 6/1971 | Magi | |
| 3,784,149 A | 1/1974 | Brudy | |
| 4,186,905 A | 2/1980 | Brudy | |
| 4,489,447 A | 12/1984 | Umehara | |
| 4,506,408 A | 3/1985 | Brown | |
| 4,785,190 A * | 11/1988 | Frankena | 250/503.1 |
| 4,989,813 A | 2/1991 | Kim et al. | |
| 5,111,503 A | 5/1992 | Takagi | |
| 5,190,390 A * | 3/1993 | Ming-Tai | 403/24 |
| 5,206,790 A | 4/1993 | Thomas et al. | |
| 5,255,214 A * | 10/1993 | Ma | 361/680 |
| 5,425,157 A | 6/1995 | Chang | |
| 5,551,125 A | 9/1996 | Adams | |
| 5,600,870 A | 2/1997 | Fields et al. | |
| 5,765,263 A | 6/1998 | Bolinas et al. | |
| 6,106,181 A | 8/2000 | Neuhof | |
| 6,152,410 A * | 11/2000 | Mark | 248/220.1 |
| 6,233,784 B1 | 5/2001 | Daoud | |
| 6,263,543 B1 | 7/2001 | Daoud | |

(Continued)

FOREIGN PATENT DOCUMENTS

GB        2305690        4/1997

(Continued)

*Primary Examiner*—Chuck Y. Mah
(74) *Attorney, Agent, or Firm*—Banner & Witcoff, Ltd.

(57) ABSTRACT

A hinge assembly containing a receiver member having a corrugated inner surface and a locking pin for being pivotally disposed within the receiver portion about an axis. The locking pin and receiver member have complementary corrugated engaging surfaces that allow the hinge to provide support for a cantilevered structure when the pin and receiver are engaged. When the complimentary pin and receiver are disengaged, the pin member can be incrementally rotated so as to allow the cantilevered structure to be positioned in a different position or orientation.

12 Claims, 12 Drawing Sheets

U.S. PATENT DOCUMENTS

| | | |
|---|---|---|
| 6,264,392 B1 | 7/2001 | Wise et al. |
| 6,726,336 B2 * | 4/2004 | Matsuda et al. ............ 353/122 |
| 6,929,224 B1 | 8/2005 | Masuda et al. |
| 6,947,279 B2 | 9/2005 | Cheng et al. |

FOREIGN PATENT DOCUMENTS

| | | |
|---|---|---|
| JP | 11351237 | 12/1999 |

* cited by examiner

INCREMENTAL LOCKING HINGE ASSEMBLY

CROSS REFERENCE TO RELATED APPLICATIONS

This application is a continuation application of patent application Ser. No. 10/704,564 filed Nov. 12, 2003, and the contents of said application are hereby incorporated by reference.

FIELD OF THE INVENTION

Present invention is directed generally to a hinge assembly. More particularly, aspects of the present invention relate to an incremental locking hinge assembly for supporting objects.

BACKGROUND OF THE INVENTION

Individuals in computer rooms and other environments operate and use equipment which may need multiple positions for various uses. Displays and similar objects can be hung from a computer. For example, in a computer room environment previous assemblies for supporting cantilevered objects have been static. These previous assemblies offer few, if any positioning options.

A need exists for a support mechanism in use with the display of an Uninterruptible Powers Source, hereafter "UPS". Since users of a UPS, and the UPS itself, can vary significantly in height and size, a staticly mounted one-size-fits-all display would be difficult if not impossible for some users to view, to interact with, and to properly monitor.

Thus, there is a need to solve the aforementioned deficiencies as well as to fill the many unmet needs in other applications.

SUMMARY OF THE INVENTION

The present invention is directed to an apparatus that overcomes limitations described with respect to computer equipment and other environments above, and overcomes other limitations that will be apparent upon reading and understanding the present specification.

In an aspect, the present invention relates to a hinge system that provides significant adjustability to accommodate the variance in sizes of a main body to which the apparatus may be affixed, a cantilever member to which the apparatus is affixed so as to allow rotation or translation with respect to the main body. The hinge assembly may be used for affixing a wide variety of objects together so as to allow movement of a cantilever member relative to a main body.

The hinge system can be used to support a cantilever member in a static position and additionally allows movement and adjustment to the position of the cantilever member relative to the main member and/or a user. The cantilever member may include, for example, a display, a control panel, an information panel, a sensor, or a speaker. Thus, increased configurability of support assemblies is provide to allow users of varying physical attributes and users in varying positions to interact with, utilize or view the object supported by the assembly.

A first aspect of the present invention provides a hinge system comprising at least one of a cone, frusto-conical or cylindrical shaped pin member located on a spring arm, and a mating receiver. In one aspect, the profile of the pin member can be shaped like a multipoint star. A mating receiver half of the hinge may be fixed and may be the complementary of the star-shaped member. A spring arm may have enough resilient bias to allow the pin member to be pushed out of a recess of the mating receiver as the pin member is rotated about an axis. When the next set of points align between the pin and receiver, the spring arm bias causes the pin to slide into an engaged position thereby holding the pin in place, until further a rotational force is applied to allow it to be moved it to the next position within the mating receiver.

A second aspect of the invention provides a pin member with ridges and grooves. The ridges and grooves define an engaging surface formed so as to allow it to lockingly engage with a receiver member and enable a hinge assembly to support a cantilevered structure. The ridges and grooves may also be angled so as to allow the pin member to slidably engage the receiver member. Further, the pin member may be biasedly abutted against the receiver member for seating and locking functions.

A third aspect of the invention provides a mated receiver member that can be slidably engaged by a corresponding pin member. The receiver member contains a complimentary engaging surface to the engaging surface of the corresponding pin member composed of ridges and grooves. The receiver member may be affixed to a support surface and provides support through the receiver member and other hinge components.

A fourth aspect of the invention provides a method of supporting a structure so as to allow incremental user adjustability via an interlocking hinge assembly. The hinge can be locked in place, completely or partially disengaged when the attached structure is to be re-positioned, and then re-engaged to provide support for the structure located in another position.

In another aspect, the present invention provides a support system for an electronic unit, such as an UPS, that is adjustable both in height and viewing angle and that accommodates different unit heights and different user heights.

The above and other aspects, features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of embodiments, is better understood when read in conjunction with the accompanying drawings, which are included by way of example, and not by way of limitation with regard to the claimed invention.

DETAILED DESCRIPTION OF THE PREFERRED EMBODIMENTS

Illustrative Operating Environment

Figure 1:
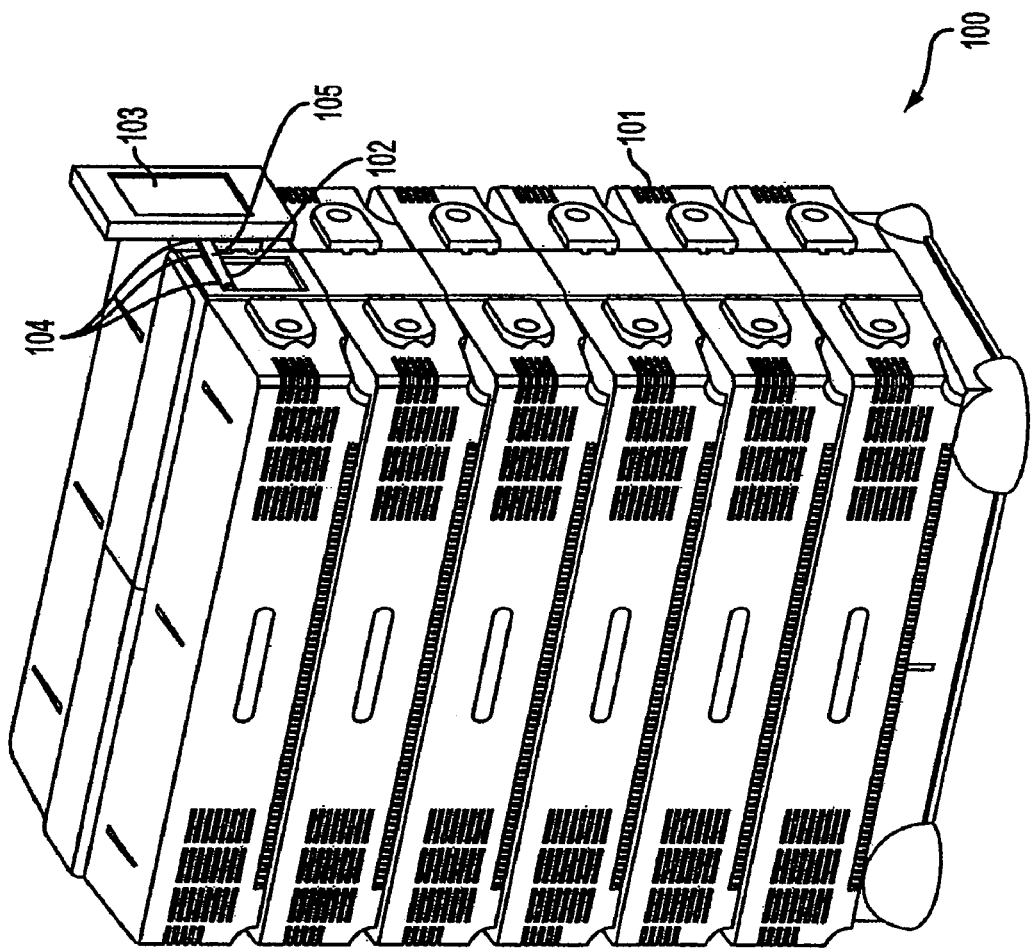
FIG. 1 is a perspective view of a display mounted to a hinge assembly according to one or more aspects of the present invention.

FIGS. 1-4 depict an uninterrupted power supply system 100 utilizing an inventive hinge assembly 201, 202 (see FIGS. 2-3) which supports a cantilevered object, such as a display unit. System 100 includes a UPS 101, a support member 102, and a display 103 that is linked to the UPS through the support member and several hinge points 104 to allow numerous view angles or control positions of the UPS 101. It should be recognized that the display 103 is electronically coupled to the hardware and may be used to control operation of the UPS.

Significant adjustability of the location and orientation of the display 103 linked to the UPS is provided in aspects of the present invention. A hinge assembly is utilized to allow for both support as well as the desired variability of the display 103 on the UPS 101. Serving as a connection between the UPS 101, the support member 102, and the display 103, hinge points 104 allow rotational movement of the support member 102 with respect to a side or wall of the UPS and rotary motions of the display 103 with respect to the support member 102.

Figure 2:
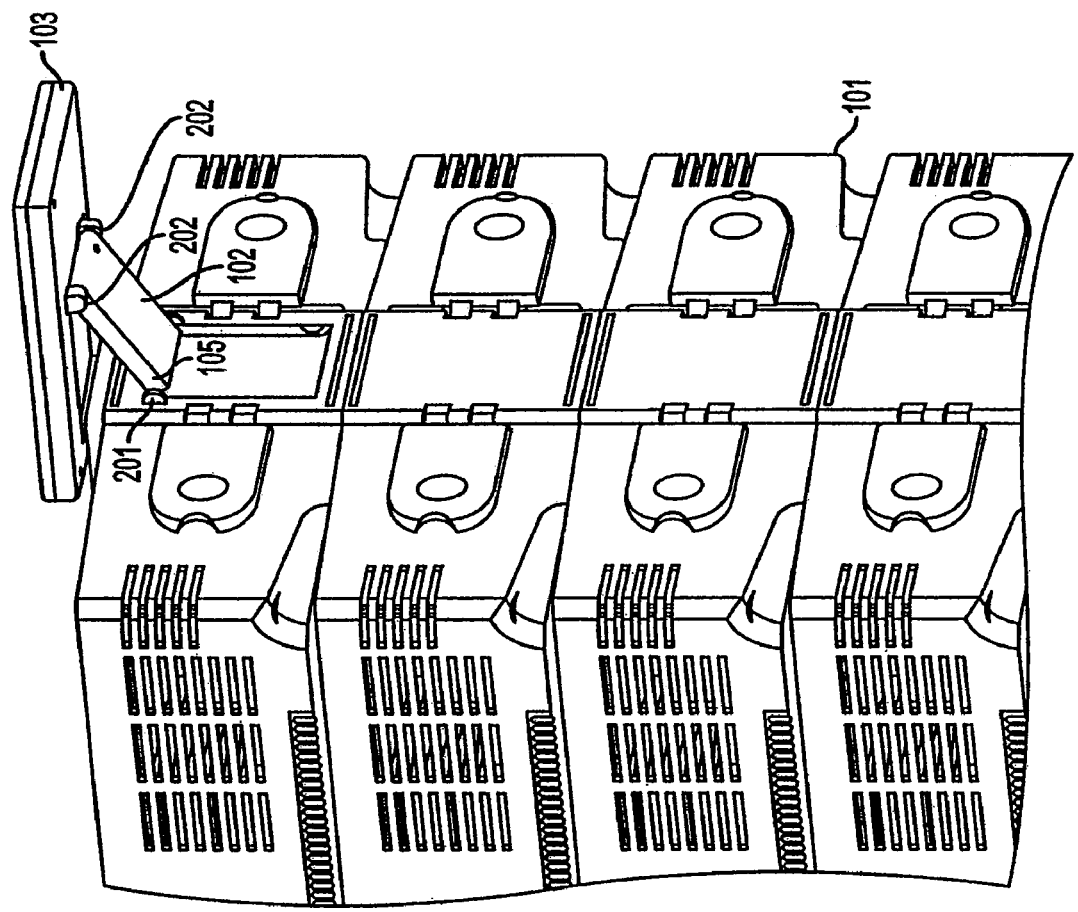
FIG. 2 is a side view of the system of FIG. 1 illustrating one position of a display.

A spring arm or a biasing member 105 is utilized in one arrangement of a hinge assembly, as depicted in FIG. 2, to allow locking engagement at the hinge location. The biasing member 105 supplies a lateral force to cause a pin to engage a receiving member. Because the biasing member can supply this lateral force through a springing mechanism, rotation is possible if an opposing force is applied that inhibits a portion of the biasing force. In other arrangements, the pin member itself may be biasing through a force-applying manner. In such an arrangement, a biasing member may not be used.

FIG. 2 illustrates the UPS system with the display 103 positioned in an alternative exemplary orientation as a result of adjustment by a user. Similarly, the display 103 can be rotated angularly upward around an axis dictated by the hinge 202 from its positioning in FIG. 1 to its current position in FIG. 2 parallel with the horizon.

To permit either the support member 102 or the display 103 to be moved as previously described, the biasing member 105 is retracted sufficiently to allow the hinge assembly to incrementally rotate. Once the support member 102 and/or display 103 is positioned as desired, the biasing member is released to allow engagement. This engagement at the hinge provides the desired structural support for the support member 102 and the display 103.

Figure 3:
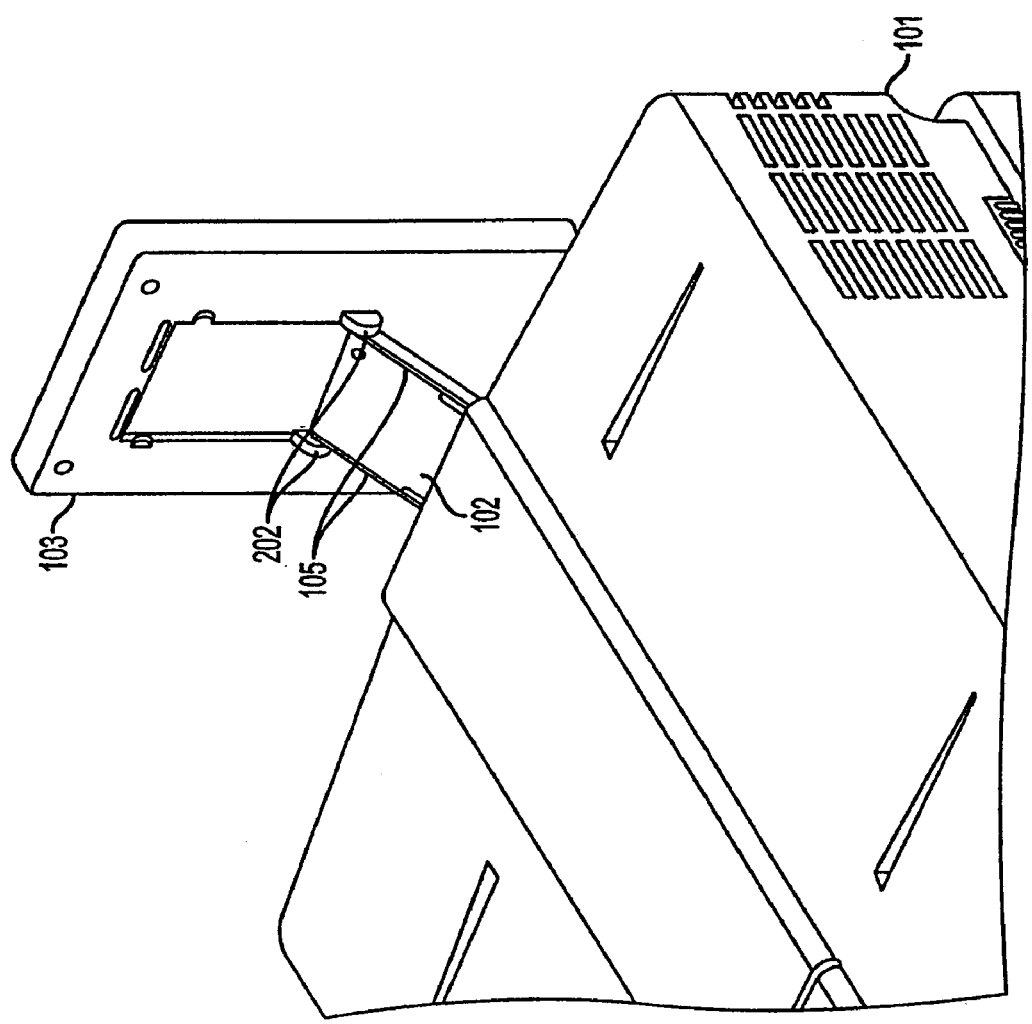
FIG. 3 is a perspective view of the system of FIG. 1 illustrating another position of the hinge assembly and display.

FIG. 3 illustrates a rear perspective view of the UPS system depicted in FIG. 1. The display 103 and support member 102 are also positioned in similar orientations as depicted in FIG. 1. In FIG. 3, both the hinges 202 that connect the display 103 to the support member 102, and the biasing members 105 that causes engagement of the hinge components are further illustrated.

Figure 4:
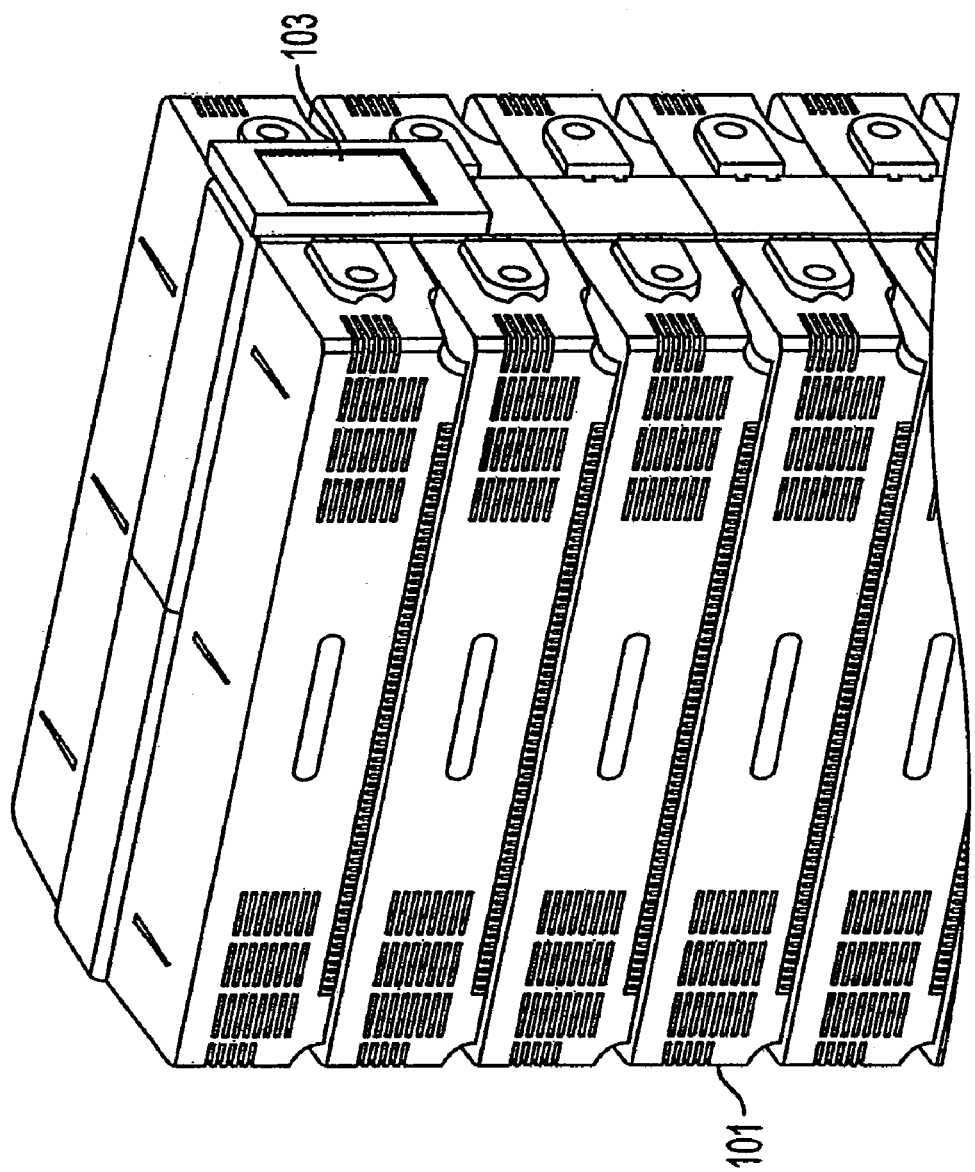
FIG. 4 is a perspective view of the system of FIG. 1 illustrating a display.

FIG. 4 illustrates the display 103, depicted in FIGS. 1-3 in yet another position. Here, the display has been positioned flush against the UPS 101 by moving the support member 102 and/or the display 103 angularly downward about one or both of the axes dictated by one of the hinges 201 or 202. The positioning of the display and support member in FIGS. 1-4 is for illustration only, as a variety of incremental positioning of these structures can be accomplished and has been contemplated by aspects of the present invention.

Illustrative Hinge

Figure 5:
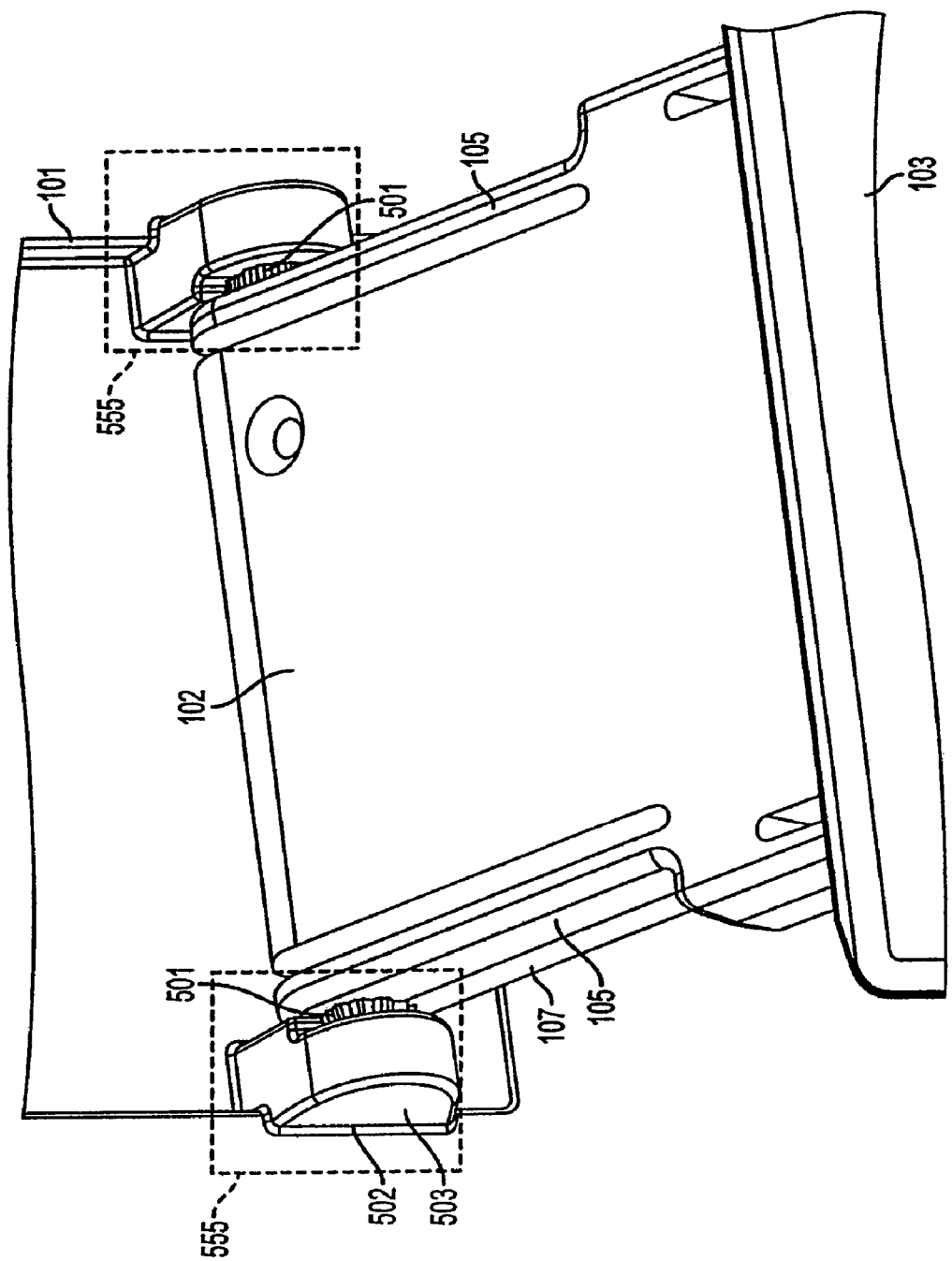
FIG. 5 is a schematic representation of an arrangement of a hinge assembly according to one or more aspects of the present invention.

FIG. 5 illustrates a hinge assembly or a hinge support system 555 connecting to a main body, such as the UPS 101, to support member 102 and display 103. Hinge assembly 555 provides structural support for an attached object, while enabling a range of incremental movement and adjustability. Hinge assembly 555 includes a pin member 501 matingly engagable with a receiver member 502. When the pin member 501 and receiver member 502 are engaged, an attached object, such as display 103, or support member 102 is statically supported. The pin member 501 may be disengaged from receiver member 502 so as to enable rotational motion of the pin 501 with respect to the receiver member 502. After the pin member 501 has been moved into an incrementally desired position, the pin member 501 may engage receiver member 502 to provide support for an attached object, such as display 103. For ease of explanation, the pin member and receiver member on both sides of the support member 102 are the same with minor modifications for adapting to the specific mounting arrangement. Accordingly, the description will focus on a single pin member and receiver member.

In the exemplary system depicted in FIG. 5, biasing member 105 supplies a biasing force that causes pin member 501 to resiliently engage receiver member 502 until an opposing force slidably disengages the pin member 501 from receiving member 502. Biasing member 105 may comprise an elongated body 107 with pin member 501 located at one end and supported at the opposite end.

Figure 6:
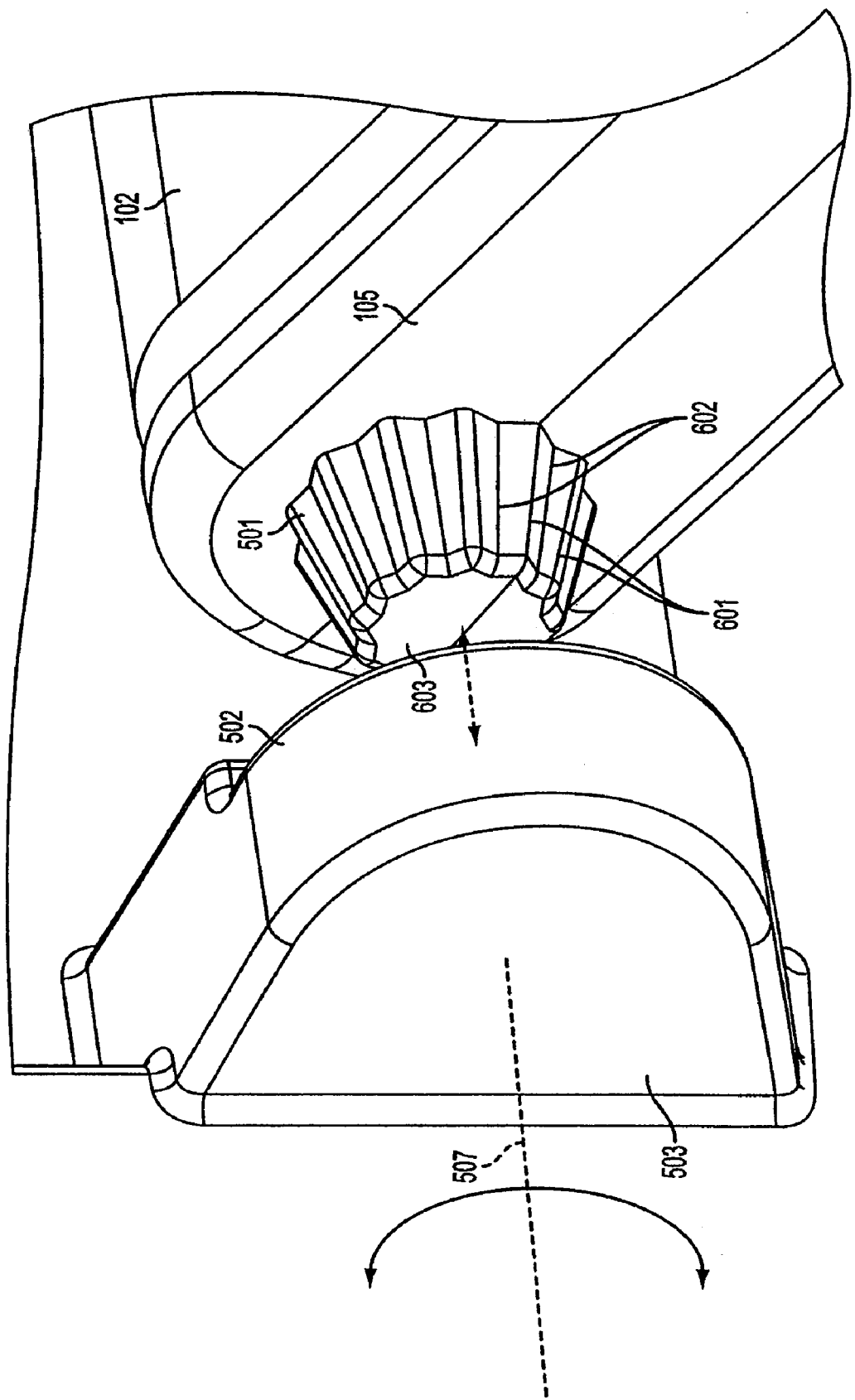
FIG. 6 and FIG. 7 are perspective views of a receiver and a locking pin of a hinge assembly according to one or more aspects of the present invention.

FIG. 6 further illustrates one arrangement of the pin member 501 and receiver member 502 that allows the hinge assembly 555 to support physical structures while in an engaged posture, yet also allows rotational movement when in a disengaged posture. Pin member 501 may be of a number of different shapes so long as it accomplishes the intended function of engaging and mating with the receiver member 502, so as to provide physical support for attached objects or members, and allow rotation when disengaged. The pin member 501 may be of conical, frusto-conical, or cylindrical shape. The engaging surface of the pin member 501 may be formed so as to have peaks or ridges 601 and valleys or grooves 602 (see FIG. 12). The ridges 601 and grooves 602 can be formed in any shape to serve the desired function of engaging and mating with the receiver member so as to provide structural support and incrementally locking at a plurality of discrete positions for the attached object. Nonetheless, the engaging surface may have a corrugated, a wavy, or star-like configurations for support and locking characteristics. In other arrangements, ridges 601 and grooves 602 may be formed in triangular, pyramidal, or frusto-pyramidal shape so as to allow engagement and also allow easy of disengagement from the receiver member 502.

Figure 7:
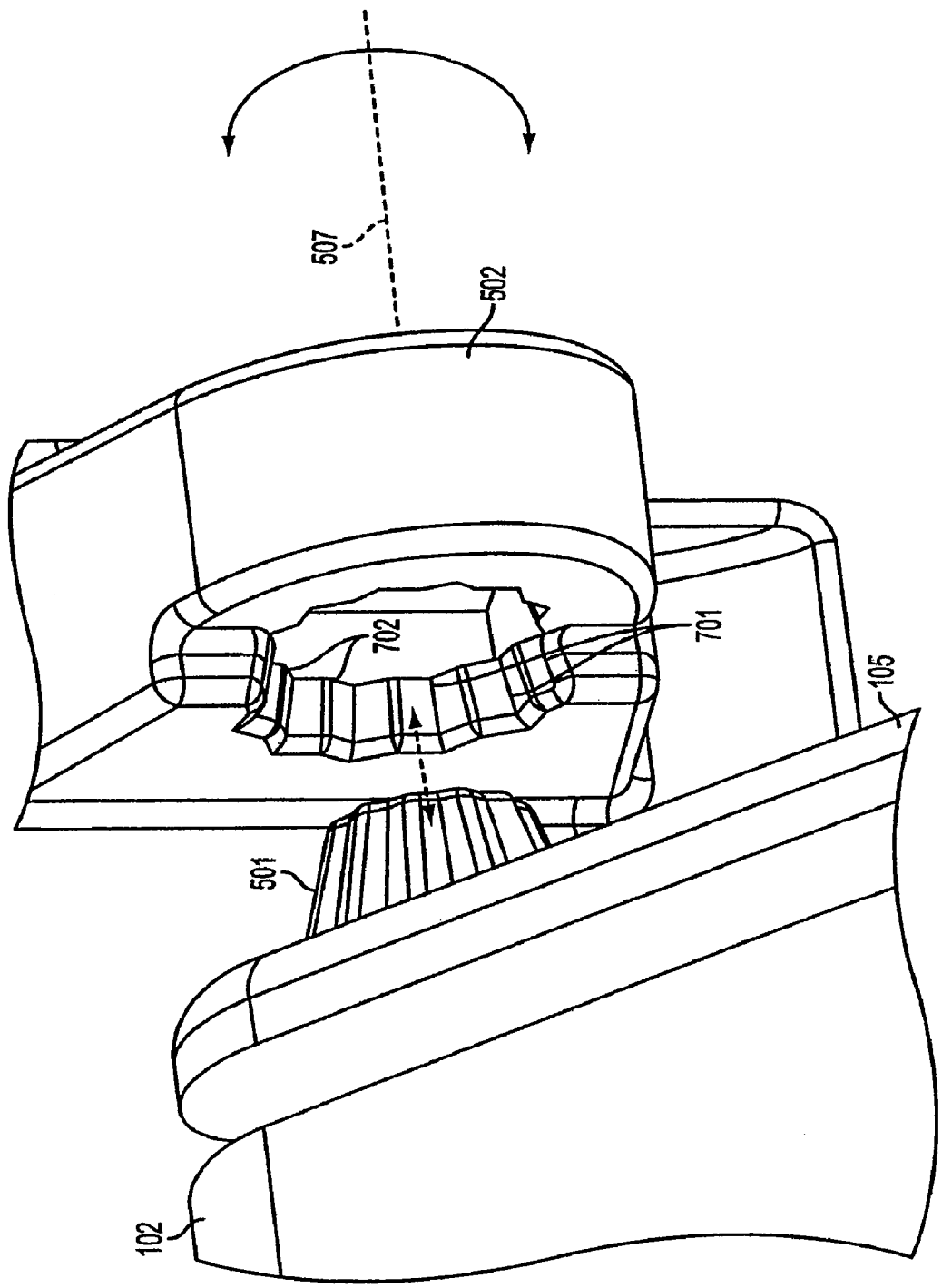
Figure 8:
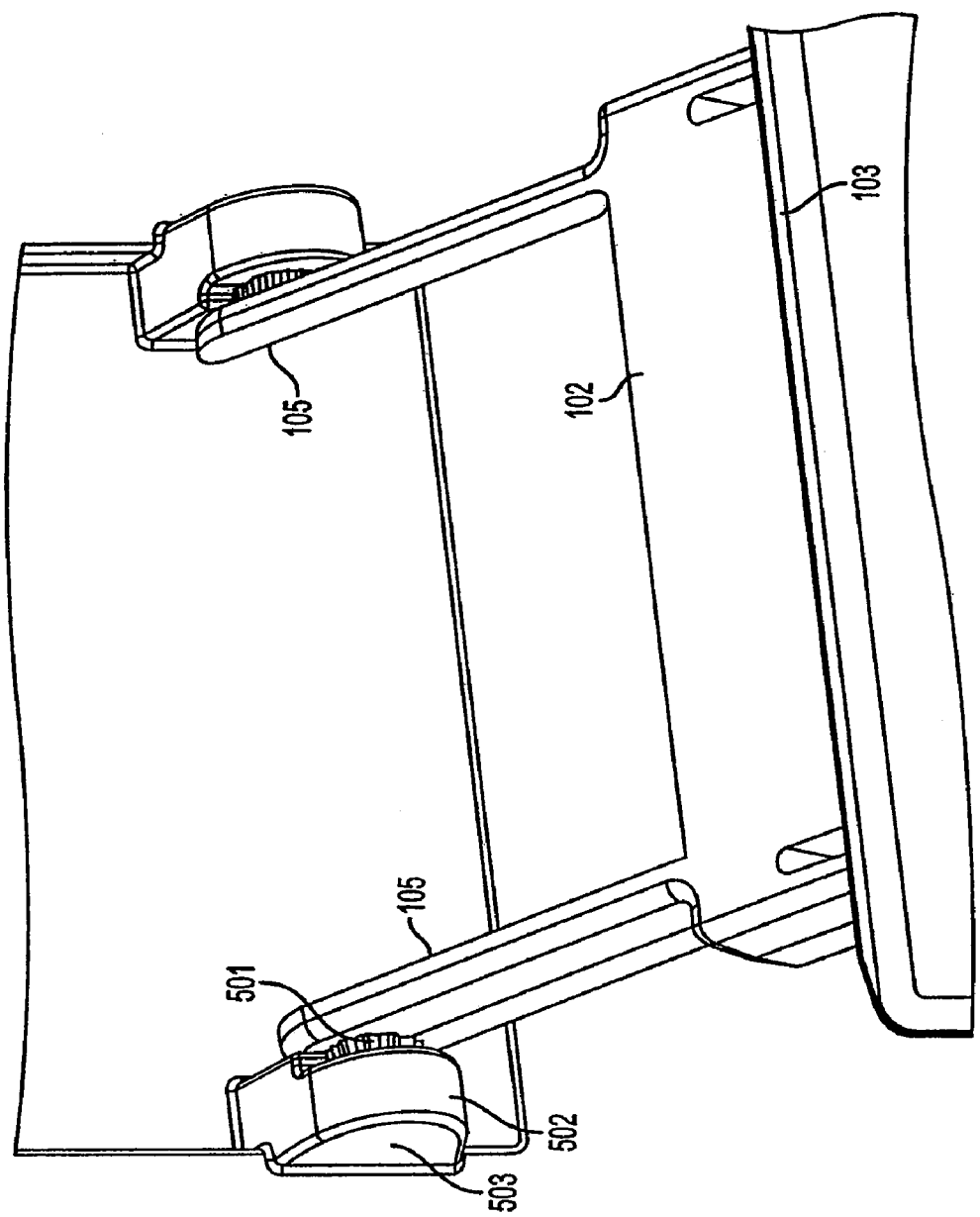
FIG. 8 is a perspective view of an alternate hinge assembly according to one or more aspects of the present invention.

The receiver member 502 may be linked to a support structure or main body. In one example, receiver member 502 may be physically affixed to UPS 101. As is illustrated in FIG. 7, the receiver member 502 may be formed as a mating compliment to an associated pin member 501. Grooves 701 and ridges 702 are also formed within the receiver member 502. The ridges and grooves of the pin member 501 and receiver member 502 are formed and located on the members so as to correlate in opposition to allow engagement therein. Ridges 601 on the pin member may align with grooves 701 on the receiver member 502, while grooves 602 of pin member 501, align with ridges 702 of member 502.

With reference to FIGS. 5-8, the receiver member 502 includes a receiving cavity so as to receivably engage with the corresponding pin member 501. In the arrangement the receiver member may have an end cover 503. In other receiver member arrangements, an end cover 503 may not be provided so that a generally ringed structure includes mating surface with ridges and grooves and the crown surface 603 exposed for other uses.

With continued reference to FIGS. 5-8, biasing member 105 may supply a biasing force laterally outward in the directions indicated in FIGS. 6 and 7 to thereby seat the attached pin member 501 against engaging inner surface of the receiver member 502. This lateral biasing force can be generated in any of the many conventional ways in which one surface is forced to press up against another surface. The pin member 501 and the receiver member 502 may be configured such that the released spring energy of biasing member 105 provides continuous engagement between the ridges 601 and grooves 602 of the pin member 501 and the corresponding grooves 701 and ridges 702 of the receiver member 502 to provide locking features.

Figure 9:
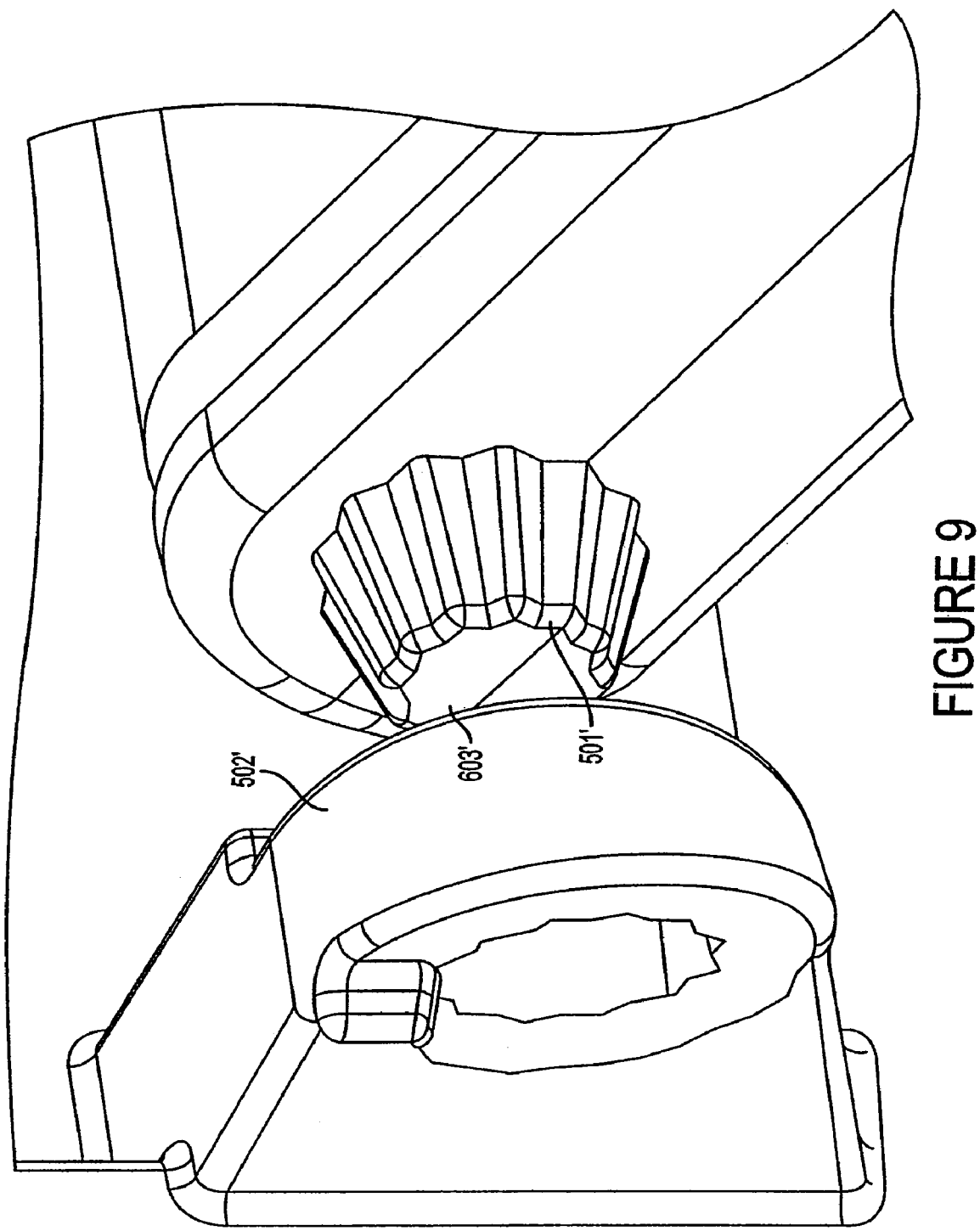
FIG. 9 is a side perspective view of an alternate hinge assembly containing an open end receiver according to one or more aspects of the present invention.

With reference to FIGS. 6 and 7, the hinge assembly 555 provides support for a member or object, such as a display 103, and also allows the member or object to be re-positioned. In one arrangement, to adjust the supporting member 102 and/or display 103 and place it in into an alternate position, pin member 105 is disengaged and slides out of its engaged position over the corresponding ridges and grooves to a further position. Rotation around the axis 507 occurs in the exemplary directions depicted by the rotational movement arrows in FIGS. 6 and 7. Biasing members 105 may assist to continually apply pressure to hold the pin member in contact with the receiver member. Biasing members 105 may be physically retracted through any conventional force application manner. For example, the user may physically retract the biasing members 105 and/or the attached pin member 501 from engagement with the receiver member 502. Further, if a receiver member 502' depicted in FIG. 9 is utilized, a user may temporarily disengage by applying an axial force on the exposed crown 603' of the pin member 501' and thereby cause the pin member to slidably disengage from the receiver member 502' to allow repositioning.

In an arrangement shown FIGS. 6 and 7, the geometry of the pin member 501 and receiver member 502 may be such that force applied by a user in a designated direction of desired rotation of the support member attached to the hinge about an axis 507 is translated so as to cause the pin member 501 to slide back from the engaged position within the receiver member cavity. This force partially or completely disengages the corresponding grooves and ridges so as to allow the pin member 501 to be rotated in the direction of the applied force to the next incremental position. In operation, the ridges 601 on pin member 501 relocate to the next complementary grooves 701 of the receiver member and slide back into the locking engagement. Nevertheless, the geometry of the ridges and grooves of pin member 501 and receiver member 502 also allows rotation of motion over multiple ridge groove pairs with the application of a sufficient rotational force.

Concurrent to the disengagement of the pin member in the aforementioned examples, the attached support member or any similar member or object supported by the hinge assembly 555 may be moved or repositioned. Once the support member is positioned in the desired position, the biasing member 105 may be released to allow the pin member 501 to slidably interact with the receiver member 502. In an adjustment operation, the pin member 501 slides over the surfaces within the corresponding cavity within the receiver member until the components are completely engaged. This adjustment process can be repeated to provide for a hinge assembly that allows for significant and frequent adjustability. In one arrangement, specific geometries and the number of ridges 601 and grooves 602 and mating grooves 701 and ridges 702 to allow for the specificity of adjustability, may be provide by an incremental angular positioning range from 2 to 30 degrees or other incremental values. In a specific example of a display, the hinge assembly 555 provides significant adjustability numerous view angles.

Figure 10:
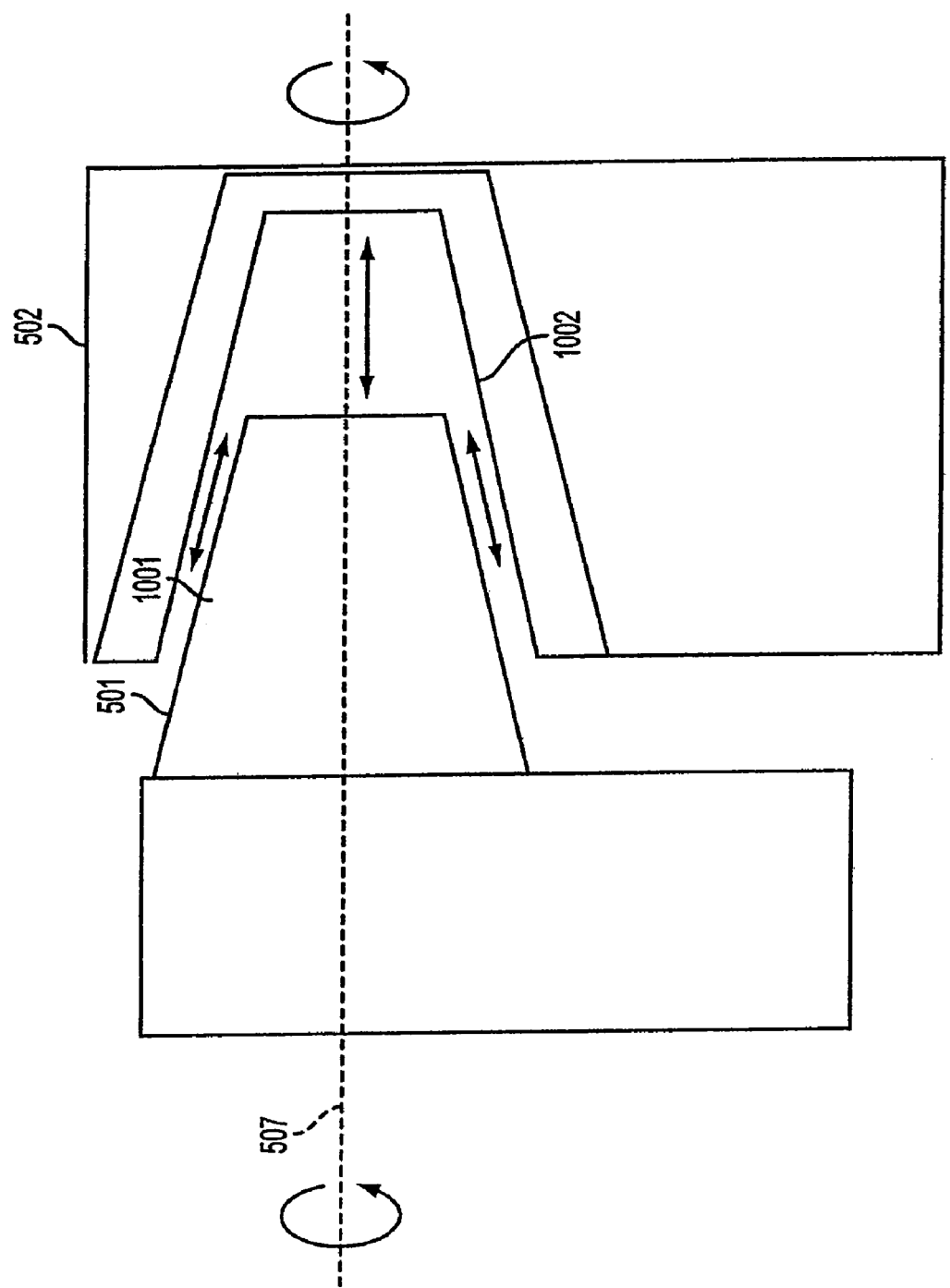
FIG. 10 is a schematic block diagram of an alternate hinge assembly according to one or more aspects of the present invention.

FIG. 10 is an illustrative block diagram depicting the interaction between the pin member 501 and receiver member 502. Additionally, a rotational axis is also visible about which the pin member 501 may be rotated. The circular arrow demonstrates one illustrative direction of rotation. The shaded portion of the diagram may be considered the engaging surfaces that mate to allow the desired hinge assembly support. Further these engaging surfaces may be shaped to cause slidable engagement and disengagement, as a result of the application of certain forces. Specifically, the pin member engaging surface 1001, the surface circumscribing the pin member and the receiver member engaging surface 1002 are visible and typically are shaped as negatives shapes of each other.

Should a hinge assembly be used for an extended period of time or frequent enough to induce wear on the components, the geometrical design as well as the mating interaction geometry allows the pin member and corresponding receiver member to engage and disengage despite wear to the components. A worn pin member may sit further down in the cavity of the receiver member, however the functionality as an adjustable and configurable support structure will not be inhibited.

Figure 11:
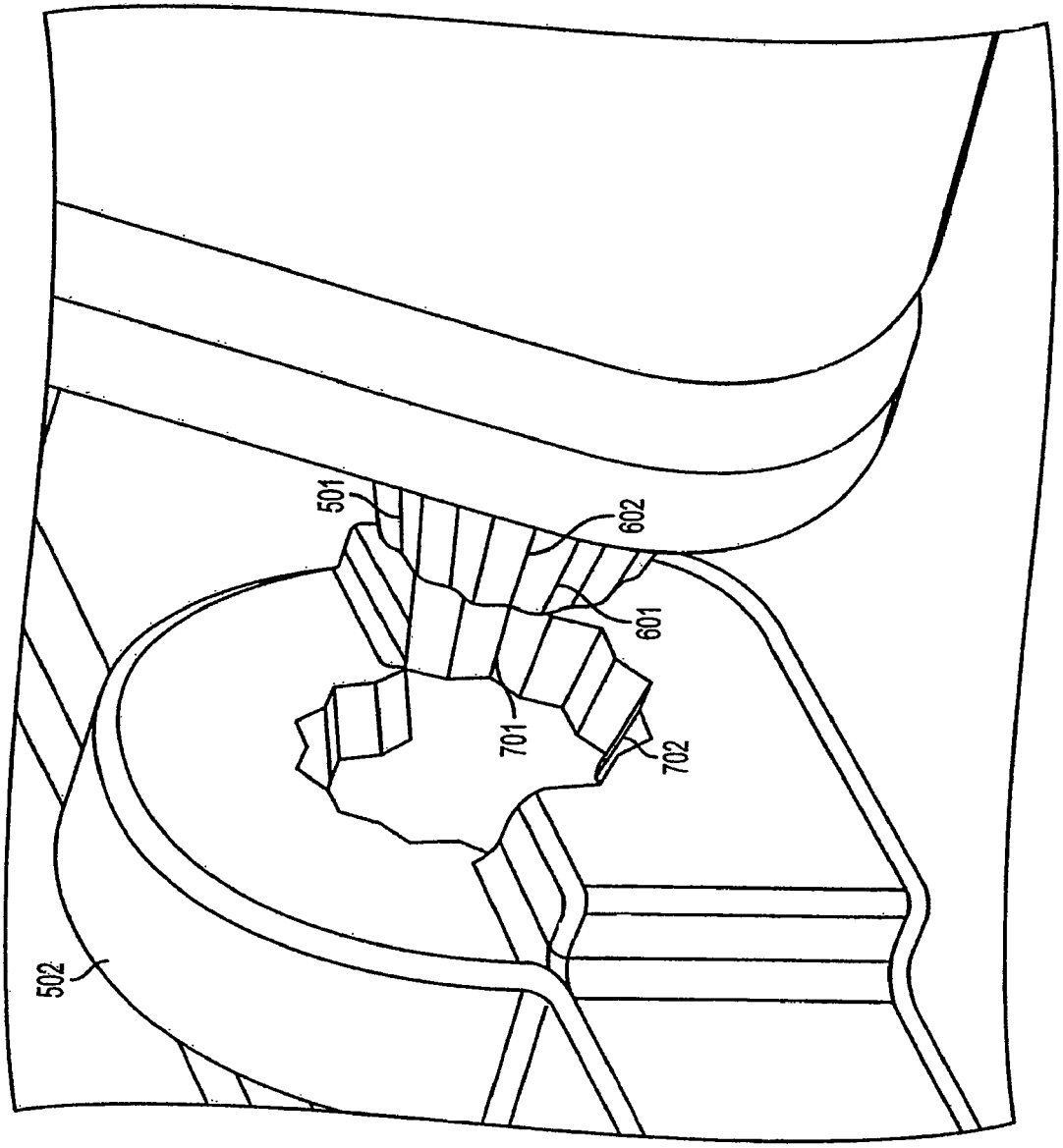
FIG. 11 is a perspective view of a receiver and a locking pin of a hinge assembly according to one or more aspects of the invention.

FIG. 11 is another perspective view of a receiver and a locking pin of a hinge assembly further illustrating an interaction between pin member 501 and receiver member 502. Additionally, the interaction between the ridges 601 and grooves 602 of a pin member and the corresponding grooves 701 and ridges 702 of a receiver member 502 is further illustrated.

Figure 12:
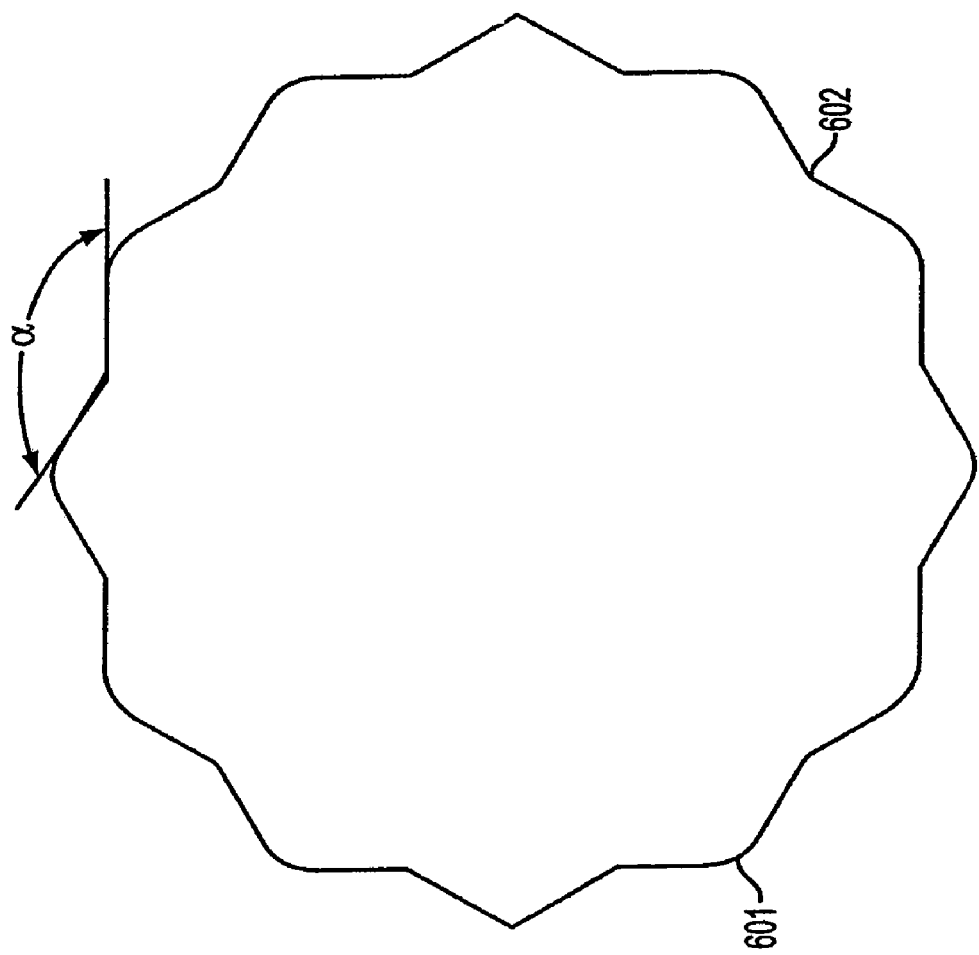
FIG. 12 is a top cross-section view outline of a pin member of a hinge assembly according to one or more aspects of the invention.

FIG. 12 is a top section view outline of a pin member of hinge assembly 555. From this view, the general outline of an exemplary pin member may be seen. Specifically, ridges 601 and grooves 602 pattern of a pin member are depicted. As discussed in the foregoing, the ridges 601 and grooves 602 may be utilized to allow for incremental locking and movement of a hinge assembly. The angle $\alpha$ between adjacent peaks can be adjusted to a desirable amount for incremental movement and locking characteristics.

SUMMARY

An aspect of the present invention provides a hinge assembly containing a receiver member having an inner surface and a locking pin for being pivotally disposed within the receiver portion about an axis. The locking pin and receiver member have complementary engaging surfaces that allow the hinge to provide support for a cantilevered structure when the pin and receiver are engaged for locking in a plurality of predetermined positions. When the complimentary pin and receiver are disengaged, the pin member can be incrementally rotated so as to allow the cantilevered structure to be positioned in a different position or orientation. Thus, aspects of the present invention provide increased variability, movement and/or rotation to allow greater functionality and userability of equipment.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. An apparatus for supporting a cantilevered screen display, comprising:
   first and a second pin members being laterally opposed, each of the first and second pin members connected to a respective spring arm, each spring arm having an elongated portion and positioned such that the spring arms are located between the first and second pin members and that the spring arms provide a resistive force when subjected to forces causing a portion of the spring arms to move towards each other when the first and second pins members are pivoted about an axis;
   first and second receiver members configured to engage the first and second pin members for pivoting about the axis;
   a support member extending between the spring arms in which the spring arms are supported thereto so that the support member moves with the pivoting of the first and second pin members; and
   a second pair of spring arms extending from the support member, each spring arm having a pin for forming a portion of the first hinge and second hinge
   a first hinge and a second hinge disposed at an respective end of the support member opposite to the first and second pins members, the first and second hinge for supporting the screen display, a second pair of spring arms extending from the support member, each spring arm having a pin for forming a portion of the first hinge and second hinge.

2. The apparatus of claim 1, wherein the first and second hinge permits the screen display to rotate incrementally about an axis formed by the hinges thereof and the first and second hinge enable the screen display to pivot relative to the support member.

3. The apparatus of claim 1, wherein the first and second pin members are frustro-conical shape for engaging the respective receiver members.

4. The apparatus of claim 3, wherein the pin members and the support member are comprise a flexible non-metallic material.

5. The apparatus of claim 1, wherein the first and second receiver members have an engaging surface composed of an alternating pattern of ridges and grooves for engaging the first and second receiver pins.

6. The apparatus of claim 5, wherein the first pin member and first receiver member each have ridges and grooves positioned in a frustro-conical ring.

7. An apparatus for supporting a screen display, comprising:
   a first and a second receiver member, each having a receiving cavity with a corrugated inner surface on one side, wherein the first and second receiver members are positioned so that the inner cavity of the first and the second receiver members are directed inward thereby forming an axis of rotation;
   a first and second locking pins for being pivotally disposed within the first and second receiver members about the axis thereof, the locking pins having a complementary outer surface configured to engage the corrugated surface of the first and second receiver members;
   a first biasing arm attached to first locking pin and a second biasing arm attached to the second locking pin, and the first and the second biasing arms extending generally perpendicular with respect to the axis of rotation, and each of the first and second biasing arms for resiliently engaging the first locking pin and second locking pin, respectively, against the first and second receiver member, respectively, when moved in a direction transverse to the axis of rotation; and
   a hinge being disposed opposite of the axis of rotation of the first and second members, the hinge permitting the screen display to rotate about an axis of rotation different from the axis of rotation of the first and second receiver members.

8. The apparatus of claim 7, wherein the inner surface of least one of the first receiving member or the second receiving member has a multiple width.

9. The apparatus of claim 7, wherein the first and second locking pins are frustro-conical.

10. The apparatus of claim 7, wherein the first and second locking pins include ridges and grooves that form an engaging surface.

11. The apparatus of claim 10, wherein the ridges and grooves have a cross-sectional profile of at one of a triangular, pyramidal, or wedge-shaped.

12. The apparatus of claim 7, wherein the apparatus comprises an powered component.

* * * * *